(12) United States Patent
Dembicki et al.

(10) Patent No.: US 6,457,330 B1
(45) Date of Patent: Oct. 1, 2002

(54) APPARATUS AND METHOD FOR DELIVERING A CASED GLASS STREAM

(75) Inventors: Michael T. Dembicki, Pemberville; Garrett L. Scott, Toledo; Kevin N. Fick, Haskins, all of OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

(21) Appl. No.: 09/455,270

(22) Filed: Dec. 6, 1999

(51) Int. Cl.⁷ .................................................. C03B 7/14
(52) U.S. Cl. ......................... 65/145; 65/29.19; 65/146; 65/121; 65/162; 65/327; 65/356
(58) Field of Search ................................ 65/29.19, 121, 65/162, 145, 146, 128, 326, 327, 356

(56) References Cited

U.S. PATENT DOCUMENTS

| | | | |
|---|---|---|---|
| 3,145,246 A | 8/1964 | Augsburger | |
| 3,288,583 A | 11/1966 | Sheldon | |
| 3,291,584 A | 12/1966 | Sheldon | |
| 3,554,727 A | 1/1971 | Stevenson | |
| 4,023,953 A | 5/1977 | Megles, Jr. et al. | |
| 4,145,200 A | * 3/1979 | Yamazaki et al. | 65/121 |
| 4,426,217 A | 1/1984 | Farrar et al. | |
| 4,457,771 A | 7/1984 | Ambrogi | |
| 4,592,770 A | 6/1986 | Pearman et al. | |
| 4,740,401 A | 4/1988 | Barkhau et al. | |
| 4,824,462 A | 4/1989 | Schwenninger | |
| 4,897,100 A | 1/1990 | Nice | |
| 5,071,459 A | 12/1991 | Kuhn | |
| 5,433,765 A | 7/1995 | Muniz et al. | |
| 5,626,641 A | 5/1997 | Yonemoto et al. | |
| 5,735,925 A | * 4/1998 | Scott | 65/121 |
| 5,776,221 A | * 7/1998 | Dembicki et al. | 65/121 |
| 5,855,640 A | 1/1999 | Scott et al. | |
| 5,935,286 A | * 8/1999 | Scott | 65/121 |

FOREIGN PATENT DOCUMENTS

| | | |
|---|---|---|
| BE | 479663 | 1/1948 |
| EP | 0722907 | 7/1996 |
| EP | 0722908 | 7/1996 |
| EP | 0866035 | 9/1998 |

* cited by examiner

Primary Examiner—James Derrington

(57) ABSTRACT

Apparatus for forming a cased glass stream having an inner core glass surrounded by an outer casing glass includes a first orifice for receiving core glass from a first source, and an orifice ring forming a second orifice vertically spaced beneath and aligned with the first orifice. A chamber surrounds the second orifice and communicates with the second orifice through a metering gap between the first and second orifices. Casing glass is delivered from a second source to the chamber, such that glass flows by gravity from the first and second sources through the orifices to form the cased glass stream. A heater ring of refractory material is disposed beneath the orifice ring, and includes at least one electrical heater embedded in the refractory material of the heater ring. The electrical heater is thus disposed external to the casing glass chamber for adding heat to casing glass flowing through the chamber to the metering gap. The heater ring in the preferred embodiment of the invention underlies and is contoured for facing engagement with the entire undersurface of the orifice ring for transferring heat energy through the orifice ring to glass in the casing glass chamber.

2 Claims, 3 Drawing Sheets

APPARATUS AND METHOD FOR DELIVERING A CASED GLASS STREAM

The present invention is directed to delivery of a glass stream for forming glass charges or gobs for glassware manufacture, and more particularly to an apparatus and method for delivering a so-called cased glass stream in which an inner or core glass is surrounded by an outer or casing glass.

BACKGROUND AND OBJECTS OF THE INVENTION

It has heretofore been proposed to provide a cased glass stream for forming glassware having layered wall segments. U.S. Pat. Nos. 4,740,401 and 5,855,640, for example, disclose techniques for delivering such a cased glass stream, in which core glass from a first source is fed through at least one first orifice. At least one second orifice is vertically spaced beneath and aligned with the first orifice, and is surrounded by a chamber that communicates with the second orifice through a metering gap between the first and second orifices. A heated tube delivers casing glass from a second source to the chamber that surrounds the second orifice. Glass flows by force of gravity from the first and second sources through the first and second orifices in such a way that a cased glass stream emerges from the second orifice. This cased glass stream may then be sheared by conventional techniques to form individual cased glass gobs for delivery to conventional glassware forming machines.

Although the techniques disclosed in the noted patents address and overcome problems theretofore extant in the art, further improvements remain desirable. For example, a problem remains concerning uniformity of distribution of casing glass thickness around the circumference of the core glass stream. The noted patents teach that the dimensions of the metering gap around the orifices are chosen to provide uniform flow resistance to casing glass at all points circumferentially around the gap. In the preferred embodiments disclosed in the noted patents, the dimensions of each gap, both parallel and perpendicular to casing glass flow, are uniform around the gap. In implementation of this technique, it has been found that the casing glass can vary in thickness by a ratio of up to 2/1 around the circumference of the core glass stream. Computer modeling and temperature measurements indicate that this thickness uniformity is due at least in part to heat loss, and consequent increase in viscosity, in the casing glass flowing through the chamber to the metering gap.

U.S. application Ser. No. 08/822,629 filed Mar. 21, 1997 discloses a technique for indirectly addressing this heat loss problem by dimensioning the metering gap to be non-uniform around the aligned orifices. Specifically, the width of the metering gap in a direction perpendicular to casing glass flow through the metering gap (i.e., axially of the cased glass stream) has a wider dimension on the side of the metering gap opposite entry of the casing glass to the chamber surrounding the metering gap. By dimensioning the gap non-uniformly in this way, resistance to glass flow through the metering gap is tailored so as to compensate at least in part for the greater distance of glass travel through the chamber, and greater heat loss during travel, so as to improve uniformity in resistance to glass flow throughout the entire glass flow path through the chamber and the metering gap. Implementation of this technique has typically improved casing glass thickness uniformity to on the order of 1.1/1 to 1.2/1.

Although the technique disclosed in the noted copending application has improved casing glass thickness uniformity as indicated, further improvements remain desirable.

For example, a metering gap may be designed for a casing glass of a specific temperature and flow characteristic, but not be as well suited for a casing glass that possesses a different temperature or flow characteristic. It is therefore a general object of the present invention to provide an apparatus and method for delivering a cased glass stream of the character disclosed in the above-noted patents that obtain improved uniformity of casing glass thickness around the circumference of the cased glass stream. A more specific object of the present invention is to provide an apparatus and method of the described character in which loss of heat during casing glass flow through the casing glass chamber to the metering gap is directly addressed by adding heat to the casing glass during flow through the chamber, with the objective being to maintain constant glass temperature and therefore constant glass viscosity during flow through the casing glass chamber to and through the metering gap.

SUMMARY OF THE INVENTION

Apparatus for forming a cased glass stream having an inner core glass surrounded by an outer casing glass includes a first orifice for receiving core glass from a first source, and an orifice ring forming a second orifice vertically spaced beneath and aligned with the first orifice. A chamber surrounds the second orifice and communicates with the second orifice through a metering gap between the first and second orifices. Casing glass is delivered from a second source to the chamber, such that glass flows by gravity from the first and second sources through the orifices to form the cased glass stream. In accordance with one aspect of the present invention, a heater ring of refractory material is disposed beneath the orifice ring, and includes at least one electrical heater embedded in the refractory material of the heater ring. The electrical heater is thus disposed external to the casing glass chamber for adding heat to casing glass flowing through the chamber to the metering gap. The heater ring in the preferred embodiment of the invention underlies and is contoured for facing engagement with the entire undersurface of the orifice ring for transferring heat energy through the orifice ring to glass in the casing glass chamber.

In the preferred embodiment of the invention, at least one temperature sensor is embedded in the heater ring for sensing temperature of the heater ring, and a control circuit is responsive to the temperature sensor for selectively applying electrical energy to the heater. In the disclosed embodiment of the invention, there are a plurality of electrical heaters and a corresponding plurality of temperature sensors embedded in the heater ring. These coils may be connected in parallel to a common control circuit, or may be connected to corresponding separate temperature control circuits responsive to the associated sensors for separately applying electrical power to the several heaters. The metering gap may be of uniform dimension around the gap, or preferably is of contoured non-uniform dimension as disclosed in the above-noted copending application. Applying controlled heat energy to the casing glass as it flows through the chamber, combined with provision of a non-uniform casing glass metering gap, improves uniformity of casing glass thickness around the cased glass stream.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
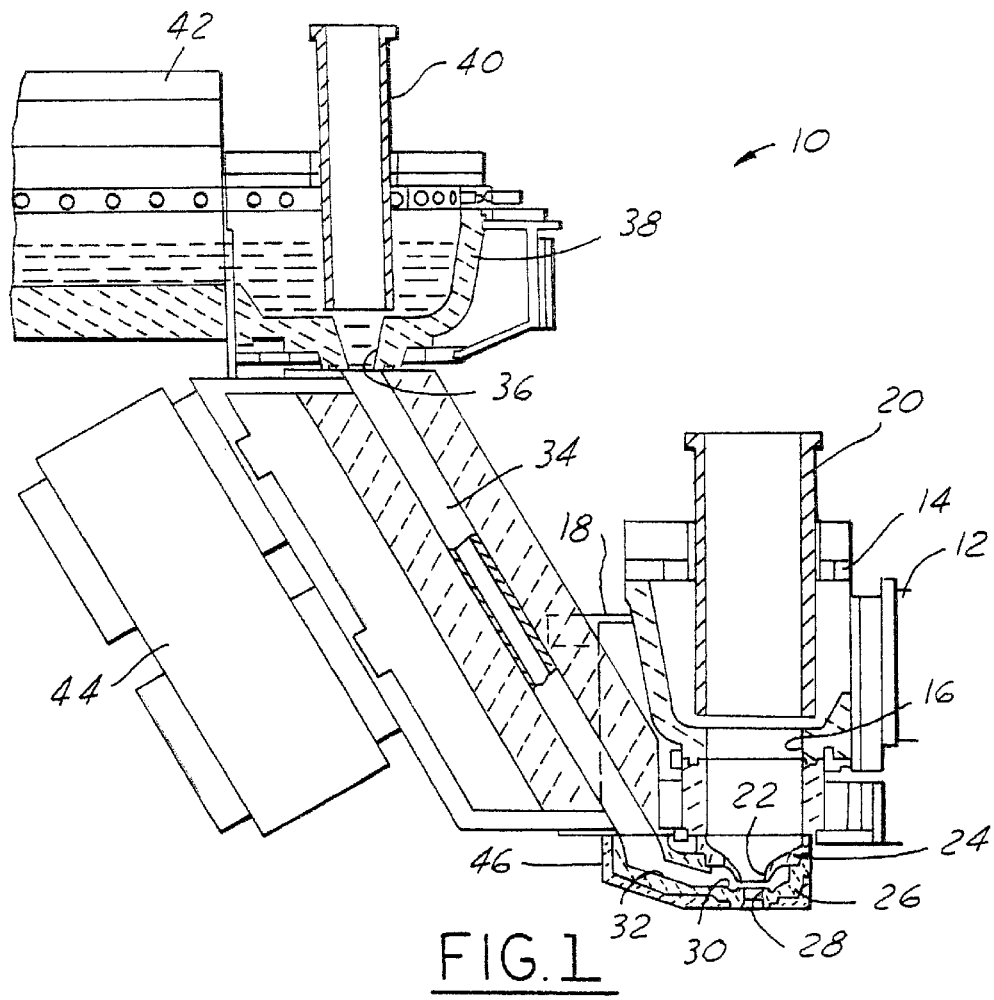
FIG. 1 is a fragmentary elevational schematic diagram of a glass delivery system in accordance with a presently preferred embodiment of the invention.

FIG. 1 illustrates a system 10 for delivering a cased glass stream. A first forehearth 12 delivers core glass to a spout 14 that has an opening 16 at the lower end thereof. Spout 14 is surrounded by a protective case 18, preferably constructed of non-magnetic metal such as stainless steel. A tube 20 controls delivery of glass from spout 14 through opening 16 to and through at least one first orifice 22 in an upper orifice ring 24 beneath spout 14. A lower orifice ring 26 carries at least one second orifice 28 positioned beneath orifice(s) 22 and axially aligned therewith. Orifice 28 is surrounded by an annular chamber 30 formed between orifice rings 24,26. Chamber 30 communicates with orifice 28 by means of a lateral metering space or gap between orifices 22, 28. Chamber 30 is coupled by a lateral passage 32 and a delivery tube 34 to the opening 36 at the lower end of a casing glass spout 38. Spout 38 includes a delivery control tube 40, and is coupled to a casing glass forehearth 42. Delivery tube 34 is resistance-heated by control electronics 44 for maintaining flow of casing glass to chamber 30. To the extent thus far described, system 10 in FIG. 1 is essentially the same as disclosed in above-noted U.S. Pat. No. 5,855,640, assigned to the assignee hereof, and incorporated herein by reference for purposes of background.

Figure 4:
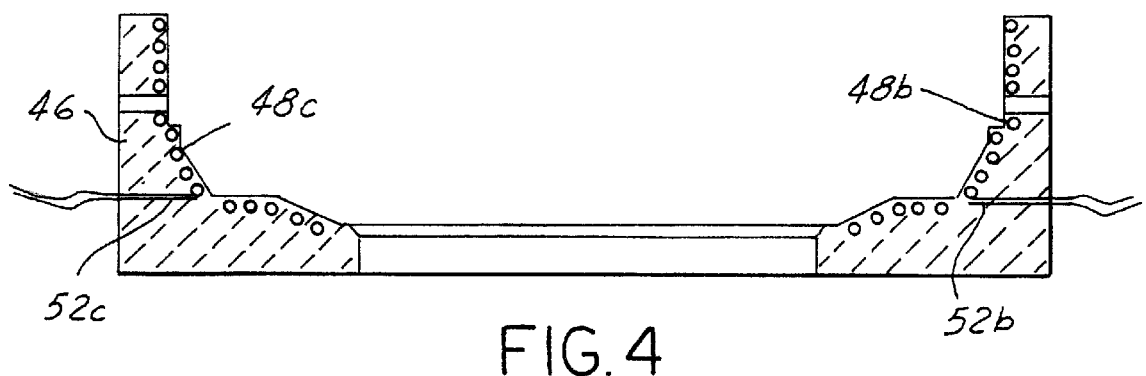
FIGS. 4 and 5 are sectional views taken substantially along the respective lines 4—4 and 5—5 in FIG. 3.
Figure 5:
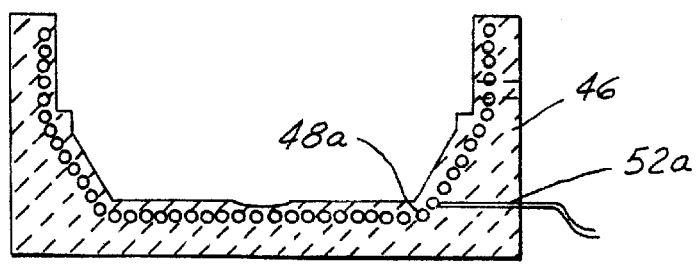
Figure 6:
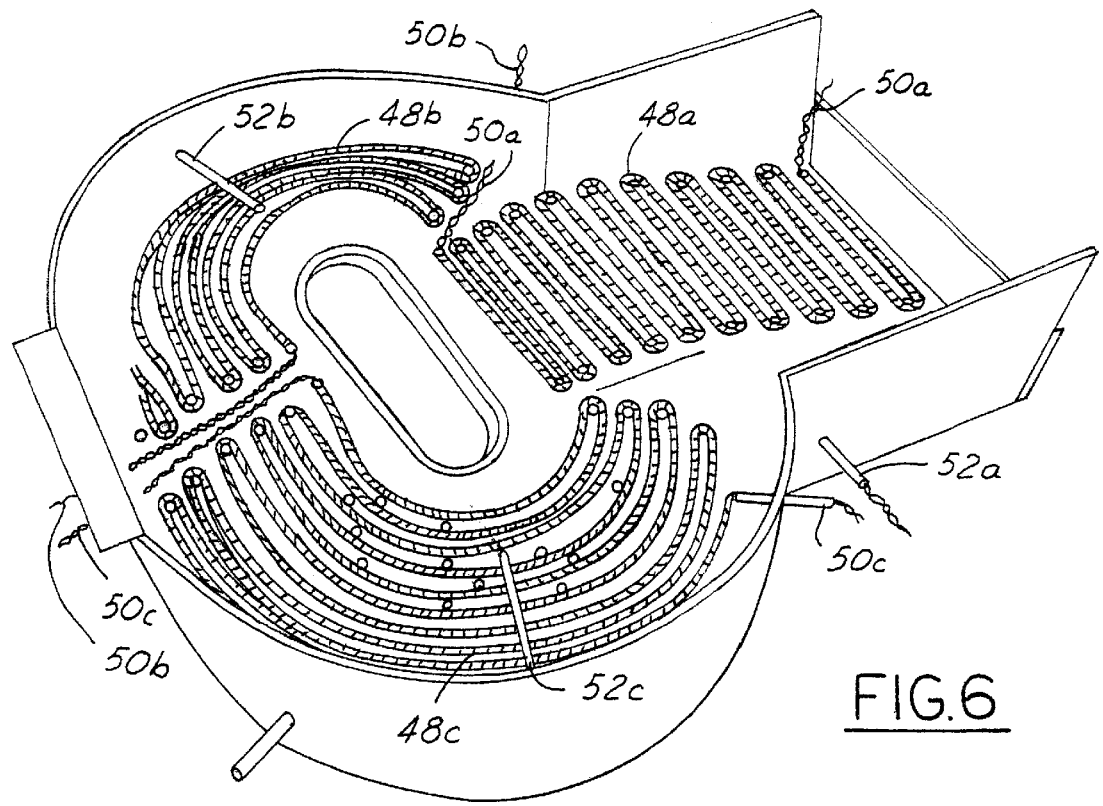
FIG. 6 is a perspective view of a mold for casting the heater ring of FIGS. 3–5.
Figure 7:
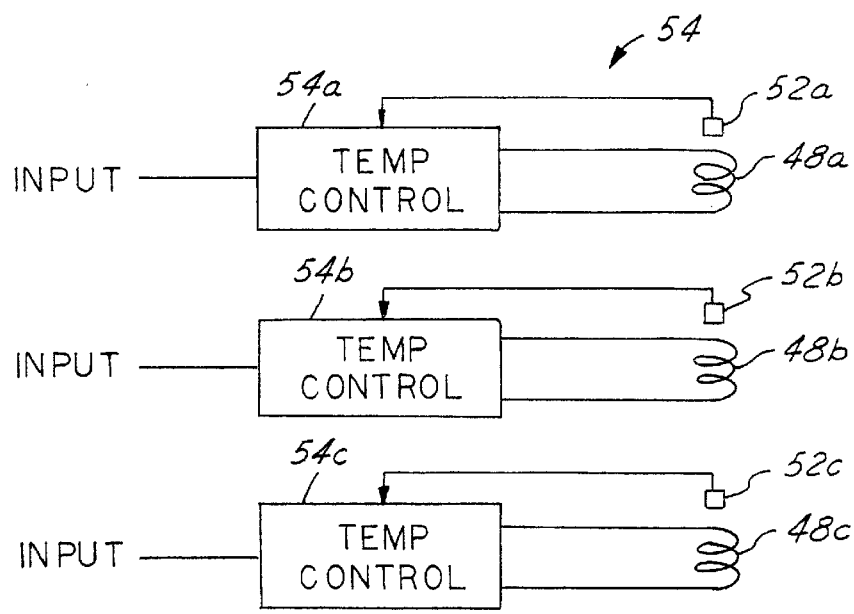
FIG. 7 is a schematic diagram of control circuitry for applying electrical energy to the heater ring in the apparatus of FIGS. 1–5.

In accordance with the present invention, a heater ring 46 underlies lower orifice ring 26. The upper surface of heater ring 46 is contoured for intimate facing engagement with the underside surface of lower orifice ring 26 for enhanced transfer of heat energy through ring 26 to chamber 30 and passage 32. Heater ring 46 comprises at least one electrical heater 48 embedded in refractory material such as ceramic, of which upper orifice ring 24 and lower orifice ring 26 are also constructed. In the presently preferred embodiment of the invention illustrated in the drawings, heater 48 comprises three heater elements or coils 48a, 48b and 48c, all of which are embedded within the refractory material of ring 46 as the ring is cast. Each heater coil 48a, 48b, 48c has a pair of leads 50a, 50b, 50c for connection to external electrical heater control circuitry 54 (FIG. 7). As shown in FIGS. 4–6, one heater coil 48a is positioned to underlie casing glass inlet passage 32 and the adjacent portion of chamber 30, while the other heater elements 48b, 48c are positioned to underlie the remaining half-sections of chamber 30. FIG. 6 illustrates the mold for casting ring 46, with heater coils 48a, 48b and 48c positioned in the mold cavity by being wound around associated pins, but prior to pouring the ceramic material into the mold. A set of temperature sensors 52a, 52b and 52c are embedded in ring 46 individually closely adjacent to the associated heater coils 48a, 48b and 48c. Thus, each temperature sensor 52a, 52b, 52c senses temperature of the heater ring closely adjacent to the associated heater coil. The heater coils preferably are positioned and closely adjacent to the upper surface of ring 46 that is disposed in facing engagement in assembly with the underside of lower orifice ring 26.

FIG. 7 illustrates temperature control electronics 54, including separate temperature control circuits 54a, 54b, 54c respectively connected to associated heater coils and temperature sensors. Each control circuit 54a, 54b, 54c receives an associated input from manual or automated control means for setting the desired temperature at the associated heater coil. Thus, each temperature control circuit controls application of electrical power to the associated coil as a function of a difference between the desired temperature input and the actual temperature measured at the associated sensor. The control scheme of FIG. 7 thus provides facility for separately controlling transfer of heat energy to the casing glass as it flows through various sections of passage 32 and chamber 30. Alternatively, all of the heater coils 48a, 48b, 48c may be connected in parallel across the output of a single control circuit. In this implementation, all of the heater coils may be of identical length, so that all coils generate the same quantity of heat energy.

Figure 2:
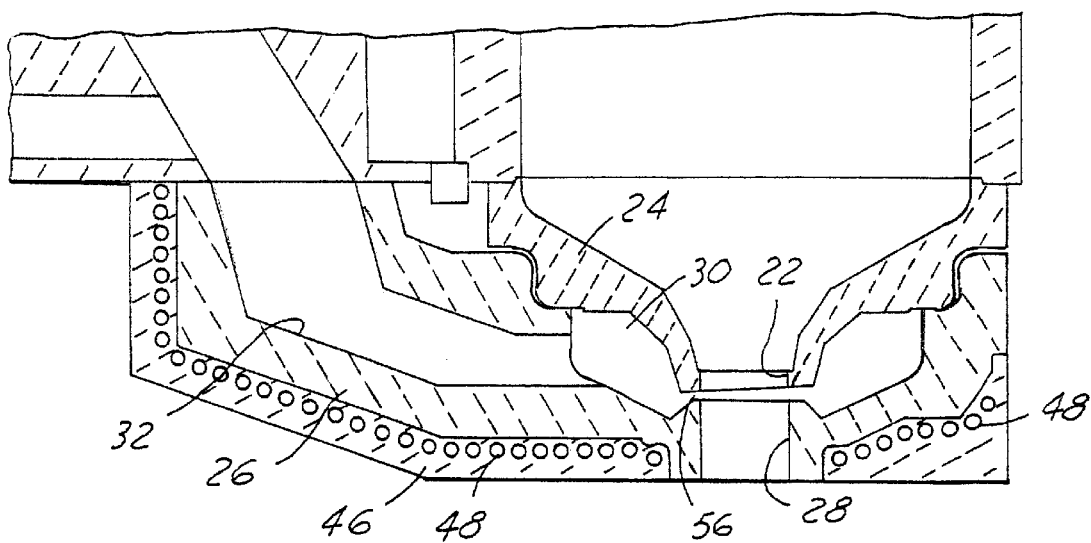
FIG. 2 is a fragmentary sectional view on an enlarged scale of the orifice rings, heater ring and metering gap in the system of FIG. 1.
Figure 3:
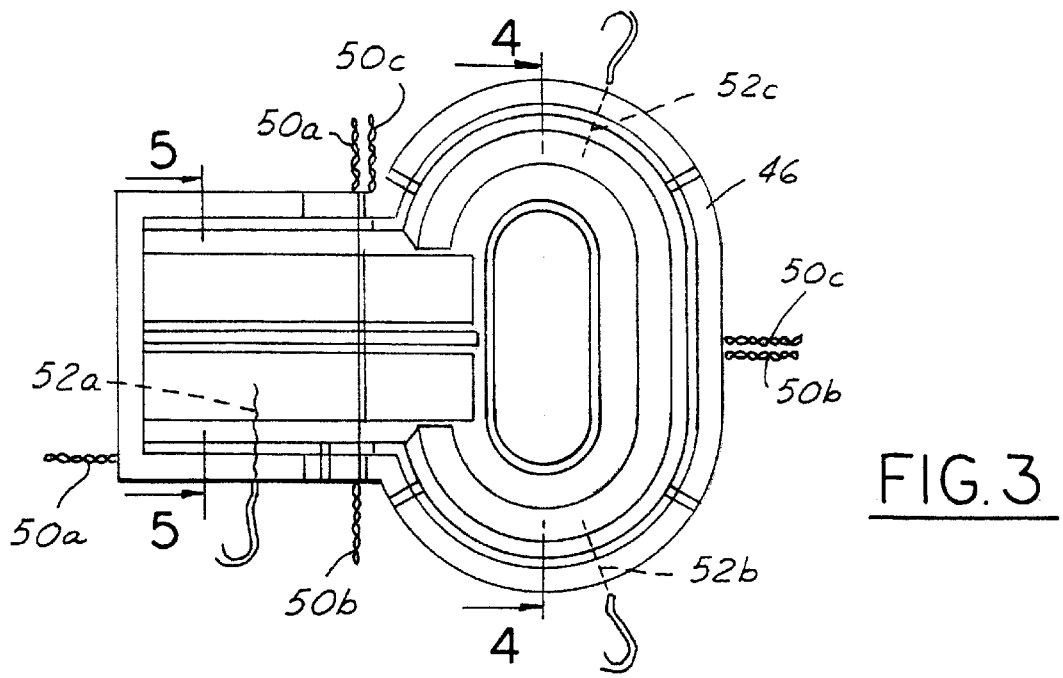
FIG. 3 is a top plan view of the heater ring in the embodiment of FIGS. 1 and 2.

Upper orifice ring 24, lower orifice ring 26 and heater ring 46 thus form a sandwiched orifice ring sub-assembly. As shown in FIG. 2, it is presently preferred that the metering gap 56 between orifice rings 24, 26 be of non-uniform dimension as disclosed in above-noted U.S. application Ser. No. 08/822,629. The disclosure of this application, assigned to the assignee hereof, is incorporated by reference for further discussion of this feature. It is believed that the combination of efficient application of heat energy to the casing glass as it flows through the orifice ring assembly, thus reducing casing glass heat loss and the consequent problem of varying casing glass viscosity, particularly when combined with a non-uniform metering gap 56, provides improved control of casing glass thickness in the final cased glass stream. However, a uniform casing glass metering gap, as disclosed in above-referenced U.S. Pat. Nos. 4,740,401 and 5,855,640, may also be employed without departing from the present invention in its broadest aspects.

During initial operation of cased glass system 20 illustrated in FIG. 1, electrical power is applied at an elevated level to heater elements 48a, 48b, 48c so as to heat the orifice ring housing sub-assembly and thaw any glass that may be frozen therein from prior operation. When the orifice ring housing sub-assembly reaches the desired elevated operating temperature, as indicated by temperature sensors 52a, 52b, 52c, the electrical energy applied to the heater elements may be reduced to a lower level so as to maintain temperature in the casing glass as it flows through passage 32 and chamber 30. It has been found that the level of electrical energy may be reduced as much as 90% between initial and steady-state operation. During steady-state operation, it is preferred to add only sufficient heat energy to maintain desired casing glass temperature during flow through passage 32 and chamber 30, and not to attempt to increase glass temperature. When using the gas-fired heater of the prior art, it was found to be difficult to maintain steady temperature during steady-state operation. Consequently, the gas-fired heater was used primarily during start-up, and was turned off during steady-state operation. The electrical heater(s) of the present invention could be cast into lower orifice ring 26, although this is not currently preferred.

There have thus been disclosed a casing glass flow control method and apparatus that fully satisfy all of the objects and aims previously set forth. Several modifications and variations have been disclosed, and others will suggest themselves to persons skilled in the art. The invention is intended to encompass all of such modifications and variations as fall within the spirit and broad scope of the appended claims.

What is claimed is:

1. Apparatus for forming a cased glass stream having an inner core glass surrounded by an outer casing glass, said apparatus comprising:

means for delivering core glass from a first source through a first orifice, an orifice ring having a second orifice vertically spaced beneath and aligned with said first orifice, a lateral passage for receiving casing glass, and a chamber surrounding said second orifice, open to said passage and communicating with said second orifice through a metering gap between said first and second orifices, means for delivering casing glass from a second source to said orifice ring through said lateral passage to said chamber, such that glass flows by gravity from said first and second sources through said orifices to form said cased glass stream, a heater ring that includes refractory material and is separate from and underlies said orifice ring, said heater ring having an upper surface in facing contact with an undersurface of said orifice ring, said heater ring including at least one electrical heater element embedded in said refractory material for supplying heat through said orifice ring to said passage and said chamber, and at least one temperature sensor also embedded in said refractory material for sensing temperature of said heater ring, and control means responsive to said at least one temperature sensor for applying electrical energy to said at least one heater element to heat said passage and said chamber through said orifice ring.

2. The apparatus set forth in claim 1 wherein said heater ring includes at least two heater elements, one disposed beneath said passage and one disposed beneath said chamber in said orifice ring, and at least two temperature sensors disposed adjacent to respective heater elements, and wherein said control means comprises means for controlling heat applied by said heater elements to said passage and to said chamber, as functions of said temperature sensors, independently of each other.

* * * * *